(12) United States Patent
Lu et al.

(10) Patent No.: US 10,908,929 B2
(45) Date of Patent: Feb. 2, 2021

(54) HUMAN VERSUS BOT DETECTION USING GESTURE FINGERPRINTING

(71) Applicant: Famous Industries, Inc., San Francisco, CA (US)

(72) Inventors: Mark H. Lu, San Francisco, CA (US); Steven E. Newcomb, San Francisco, CA (US)

(73) Assignee: Famous Industries, Inc., San Francisco, CA (US)

( * ) Notice: Subject to any disclaimer, the term of this patent is extended or adjusted under 35 U.S.C. 154(b) by 0 days.

(21) Appl. No.: 16/254,016

(22) Filed: Jan. 22, 2019

(65) Prior Publication Data

US 2019/0155624 A1 May 23, 2019

Related U.S. Application Data

(63) Continuation-in-part of application No. 15/893,643, filed on Feb. 11, 2018, now Pat. No. 10,521,249,
(Continued)

(51) Int. Cl.
*G06F 9/451* (2018.01)
*G06F 3/0488* (2013.01)
*G06F 3/0485* (2013.01)

(52) U.S. Cl.
CPC ............ *G06F 9/451* (2018.02); *G06F 3/0485* (2013.01); *G06F 3/04883* (2013.01); *G06F 2203/04104* (2013.01); *G06F 2203/04808* (2013.01)

(58) Field of Classification Search
CPC .... G06F 9/451; G06F 3/0485; G06F 3/04883; G06F 2203/04104; G06F 2203/04808
See application file for complete search history.

(56) References Cited

U.S. PATENT DOCUMENTS

| | | | |
|---|---|---|---|
| 6,448,977 B1* | 9/2002 | Braun | A63F 13/06 715/701 |
| 6,731,314 B1 | 5/2004 | Cheng et al. | |

(Continued)

FOREIGN PATENT DOCUMENTS

| | | |
|---|---|---|
| WO | 2001029702 A2 | 4/2001 |
| WO | 2003081458 A1 | 10/2003 |
| WO | 2011063561 A1 | 6/2011 |

OTHER PUBLICATIONS

International Search Report and Written Opinion for PCT/US2013/065124, dated Mar. 10, 2014 (18 pages).
(Continued)

*Primary Examiner* — Ricardo Osorio
(74) *Attorney, Agent, or Firm* — VLP Law Group LLP; Michel Bohn

(57) ABSTRACT

Various implementations related to human versus bot detection using gesture fingerprinting are described. In one such implementation, a computer-implemented method includes receiving an input associated with an application presented on a display device, capturing sensor data associated with the input, detecting a variance in the sensor data, comparing the variance with variance criteria, determining whether the input is provided by a human user or mimicked by a programmed device based on the comparison of the variance with the variance criteria, and storing the determination as analytics data in association with the application.

14 Claims, 9 Drawing Sheets

Related U.S. Application Data which is a continuation of application No. 15/479,593, filed on Apr. 5, 2017, now abandoned, which is a continuation of application No. 15/342,000, filed on Nov. 2, 2016, now Pat. No. 9,652,076, which is a continuation of application No. 14/454,441, filed on Aug. 7, 2014, now Pat. No. 9,501,171, which is a continuation-in-part of application No. 14/054,570, filed on Oct. 15, 2013.

(60) Provisional application No. 62/619,113, filed on Jan. 19, 2018, provisional application No. 61/714,130, filed on Oct. 15, 2012, provisional application No. 61/863,288, filed on Aug. 7, 2013.

(56) References Cited

U.S. PATENT DOCUMENTS

| | | |
|---|---|---|
| 6,922,724 B1 | 7/2005 | Freeman et al. |
| 7,069,507 B1 | 6/2006 | Alcazar et al. |
| 7,152,210 B1 | 12/2006 | Van Den Hoven et al. |
| 7,469,381 B2 | 12/2008 | Ording |
| 7,479,949 B2 | 1/2009 | Jobs et al. |
| 7,786,975 B2 | 8/2010 | Ording et al. |
| 8,239,784 B2 | 8/2012 | Hotelling et al. |
| 8,701,032 B1 | 4/2014 | Zhai et al. |
| 8,752,183 B1 | 6/2014 | Heiderich et al. |
| 9,245,177 B2 | 1/2016 | Perez |
| 9,323,503 B1 | 4/2016 | Fontes et al. |
| 9,449,516 B2 | 9/2016 | Ricci |
| 9,461,876 B2 | 10/2016 | Van Dusen et al. |
| 9,501,171 B1 | 11/2016 | Newcomb et al. |
| 10,203,866 B2 | 2/2019 | Karunamuni et al. |
| 10,331,293 B2 | 6/2019 | Bastide et al. |
| 2001/0001879 A1 | 5/2001 | Kubik et al. |
| 2002/0036618 A1 | 3/2002 | Wakai et al. |
| 2002/0194388 A1 | 12/2002 | Boloker et al. |
| 2003/0063073 A1 | 4/2003 | Geaghan et al. |
| 2003/0101235 A1 | 5/2003 | Zhang |
| 2004/0002902 A1* | 1/2004 | Muehlhaeuser ........ H04L 63/12 705/26.1 |
| 2004/0189720 A1 | 9/2004 | Wilson et al. |
| 2004/0194115 A1 | 9/2004 | Mogilevsky et al. |
| 2004/0230903 A1 | 11/2004 | Elza et al. |
| 2004/0261083 A1 | 12/2004 | Alcazar et al. |
| 2005/0012723 A1 | 1/2005 | Pallakoff |
| 2005/0022211 A1 | 1/2005 | Veselov et al. |
| 2006/0010400 A1 | 1/2006 | Dehlin et al. |
| 2006/0080604 A1 | 4/2006 | Anderson |
| 2006/0101354 A1 | 5/2006 | Hashimoto et al. |
| 2006/0200331 A1 | 9/2006 | Bordes |
| 2006/0218511 A1 | 9/2006 | Kapoor |
| 2007/0110083 A1 | 5/2007 | Krishnamoorthy et al. |
| 2007/0250823 A1 | 10/2007 | Kono |
| 2008/0036743 A1 | 2/2008 | Westerman et al. |
| 2008/0098296 A1 | 4/2008 | Brichford et al. |
| 2008/0126944 A1 | 5/2008 | Curtis et al. |
| 2008/0168384 A1 | 7/2008 | Platzer et al. |
| 2008/0209442 A1 | 8/2008 | Setlur et al. |
| 2009/0106775 A1 | 4/2009 | Cermak et al. |
| 2009/0210819 A1 | 8/2009 | Fujimoto et al. |
| 2009/0244309 A1* | 10/2009 | Maison ................ A63F 13/213 348/222.1 |
| 2010/0197395 A1 | 8/2010 | Geiss |
| 2010/0229186 A1 | 9/2010 | Sathish |
| 2010/0325575 A1 | 12/2010 | Platzer et al. |
| 2011/0022332 A1* | 1/2011 | Kailas ................... G16H 50/20 702/42 |
| 2011/0164029 A1 | 7/2011 | King et al. |
| 2011/0196864 A1 | 8/2011 | Mason et al. |
| 2011/0202847 A1 | 8/2011 | Dimitrov |
| 2011/0261083 A1 | 10/2011 | Wilson |
| 2011/0264787 A1 | 10/2011 | Mickens et al. |
| 2011/0267083 A1 | 11/2011 | Tsuji |
| 2012/0013619 A1 | 1/2012 | Brath |
| 2012/0017147 A1 | 1/2012 | Mark |
| 2012/0062604 A1 | 3/2012 | Lobo et al. |
| 2012/0137233 A1 | 5/2012 | Lewontin |
| 2012/0167017 A1 | 6/2012 | Oh |
| 2012/0173977 A1 | 7/2012 | Walker et al. |
| 2012/0174121 A1 | 7/2012 | Treat et al. |
| 2012/0191993 A1 | 7/2012 | Drader et al. |
| 2012/0268364 A1 | 10/2012 | Minnen |
| 2013/0046518 A1 | 2/2013 | Mejdrich et al. |
| 2013/0086516 A1 | 4/2013 | Rodgers |
| 2013/0132818 A1 | 5/2013 | Anders et al. |
| 2013/0132895 A1 | 5/2013 | Németh et al. |
| 2013/0141375 A1 | 6/2013 | Ludwig et al. |
| 2013/0159893 A1 | 6/2013 | Lewin et al. |
| 2013/0176308 A1 | 7/2013 | Mueller |
| 2013/0218721 A1 | 8/2013 | Borhan et al. |
| 2013/0266292 A1 | 10/2013 | Sandrew et al. |
| 2013/0294651 A1 | 11/2013 | Zhou et al. |
| 2013/0326430 A1 | 12/2013 | Devi et al. |
| 2013/0346851 A1 | 12/2013 | Leece |
| 2014/0157209 A1 | 6/2014 | Dalal et al. |
| 2014/0201666 A1 | 7/2014 | Bedikian et al. |
| 2014/0201671 A1 | 7/2014 | Zhai et al. |
| 2014/0250360 A1 | 9/2014 | Jiang et al. |
| 2014/0289867 A1 | 9/2014 | Bukai |
| 2014/0354540 A1 | 12/2014 | Barazi |
| 2015/0029092 A1 | 1/2015 | Holz et al. |
| 2015/0073907 A1 | 3/2015 | Purves et al. |
| 2015/0091790 A1 | 4/2015 | Forutanpour et al. |
| 2015/0120043 A1* | 4/2015 | Howard ................ B25J 11/003 700/246 |
| 2015/0205474 A1 | 7/2015 | Donelan |
| 2015/0243324 A1 | 8/2015 | Sandrew et al. |
| 2015/0277569 A1 | 10/2015 | Sprenger et al. |
| 2015/0371023 A1 | 12/2015 | Chen et al. |
| 2017/0074652 A1* | 3/2017 | Send ..................... G06F 3/0304 |
| 2017/0168622 A1* | 6/2017 | Kikinis ................. G02F 1/1368 |
| 2017/0345218 A1* | 11/2017 | Bedikian ................ A61B 3/102 |
| 2018/0204111 A1 | 7/2018 | Zadeh et al. |
| 2018/0218389 A1 | 8/2018 | Walker et al. |
| 2019/0012442 A1 | 1/2019 | Hunegnaw |
| 2019/0385066 A1* | 12/2019 | Dong ..................... G06N 5/02 |
| 2020/0097071 A1* | 3/2020 | Johnston ................ G06F 1/163 |

OTHER PUBLICATIONS

Shields, M. Facebook Discloses Another Metrics Mishap Affecting Publishers. WSJ. N.p., 2016. Web., Jan. 12, 2017.

Fraudulent Online Ad Scheme Considered Biggest Ever, Cbsnews.com, N.p., 2016, Web., Jan. 12, 2017.

* cited by examiner

HUMAN VERSUS BOT DETECTION USING GESTURE FINGERPRINTING

CROSS-REFERENCE TO RELATED APPLICATIONS

This application claims the benefit under 35 U.S.C. § 119(e) of U.S. Provisional Patent Application No. 62/619,113, entitled "Gesture Fingerprinting" and filed Jan. 19, 2018. The entire contents of which are incorporated herein by reference. This application is a continuation-in-part of U.S. patent application Ser. No. 15/893,643, entitled "Gesture Fingerprinting," filed on Feb. 11, 2018, which is a continuation of U.S. patent application Ser. No. 15/479,593, entitled "Gesture Fingerprinting," filed on Apr. 5, 2017, which is a continuation of U.S. patent application Ser. No. 15/342,000, entitled "Gesture Fingerprinting," filed on Nov. 2, 2016, which is a continuation of U.S. application Ser. No. 14/454,441, entitled "Gesture Fingerprinting," filed on Aug. 7, 2014, which is a continuation-in-part of U.S. patent application Ser. No. 14/054,570, entitled "Efficient Manipulation of Surfaces in Multi-Dimensional Space Using Energy Agents," filed on Oct. 15, 2013, which claims the benefit under 35 U.S.C. § 119(e) of U.S. Provisional Patent Application No. 61/714,130, entitled "User Input Conversion System Using Vector Agents for Rendering Images," filed Oct. 15, 2012, the entire contents of each of which are incorporated herein by reference and also claims the benefit under 35 U.S.C. § 119(e) of U.S. Provisional Patent Application No. 61/863,288, entitled "Gesture Fingerprinting" and filed Aug. 7, 2013, the entire contents of which are incorporated herein by reference.

BACKGROUND

The present disclosure relates to human versus bot detection using gesture-fingerprinting technology. More particularly, for instance, the present disclosure relates to gesture-fingerprinting technology that allows a computing application running on a computing device to be determining whether an input originated from a human user or a bot and creating analytics based on the determination.

Ad fraud has become a pervasive problem in the digital marketing space in recent years. Ad fraud reflects the prevalence of bot traffic replicating the actions of real people to drive ad revenue, the misrepresentation by publishers of their URLs to buyers (e.g., to get them to buy impressions on sites with stolen content, also called URL masking), and other surreptitious acts.

These problems have been well documented by news periodicals, such as:
  Shields, Mike. "Facebook Discloses Another Metrics Mishap Affecting Publishers". *WSJ*. N.p., 2016. Web. 12 Jan. 2017.
  "Fraudulent Online Ad Scheme Considered Biggest Ever". *Cbsnews.com*. N.p., 2016. Web. 12 Jan. 2017.

Applications are generally not configured to distinguish between different inputs as coming from users or bots, which can result in the application improperly counting views of applications. For instance, the application may count views of applications by bots when used for selling advertisements, resulting in inflated numbers for the advertisers to pay for.

SUMMARY

According to one innovative aspect of the subject matter described in this disclosure, a method of human versus bot detection is described. One general aspect includes a computer implemented method for determining an input source, the method including: receiving an input associated with an application presented on a display device; capturing sensor data associated with the input; detecting a variance in the sensor data; comparing the variance with variance criteria; determining whether the input is provided by a human user or mimicked by a programmed device based on the comparison of the variance with the variance criteria; and storing the determination as analytics data in association with the application.

Implementations may include one or more of the following features. The computer implemented method where the input is a touch on a touchscreen of the display device. The computer implemented method where the variance in the sensor data is a deviation in the input captured in the sensor data. The computer implemented method where the variance criteria is a characteristic of the sensor data expected based on the input, and the variance criteria includes a threshold of the deviation. The computer implemented method where determining whether the input is provided by the human user or mimicked by the programmed device further includes: determining that the input is provided by the human user responsive to the deviation in the input exceeding the threshold of the deviation of the variance criteria. The computer implemented method where the deviation in the input is a change in one of a direction of the input and a pressure of the input. The computer implemented method where the deviation in the input is a change in accelerometer data of the display device. The method where detecting the variance in the sensor data further includes: detecting a location of the input on a touchscreen of the display device; and comparing the location of the input on the touchscreen to a variability profile to detect the variance in the location of the input on the touchscreen.

One general aspect includes a system including: one or more processors; and one or more memories storing instructions that, when executed by the one or more processors, cause the system to perform operations including: receiving an input associated with an application presented on a display device; capturing sensor data associated with the input; detecting a variance in the sensor data; comparing the variance with variance criteria; determining whether the input is provided by a human user or mimicked by a programmed device based on the comparison of the variance with the variance criteria; and storing the determination as analytics data in association with the application.

Implementations may include one or more of the following features. The system where the input is a touch on a touchscreen of the display device. The system where the variance in the sensor data is a deviation in the input captured in the sensor data. The system where the variance criteria is a characteristic of the sensor data expected based on the input, and the variance criteria includes a threshold of deviation. The system where determining whether the input is provided by the human user or mimicked by the programmed device further includes: determining that the input is provided by the human user responsive to the deviation in the input exceeding the threshold of the deviation of the variance criteria. The system where the deviation in the input is a change in one of a direction of the input and a pressure of the input. The system where the deviation in the input is a change in accelerometer data of the display device. The system where detecting the variance in the sensor data further includes: detecting a location of the input on a touchscreen of the display device; and comparing the location of the input on the touchscreen to a variability profile to detect the variance in the location of the input on the touchscreen.

One general aspect includes a computer implemented method for determining an input source, the method including: receiving an input associated with an application presented on a display device, the input including a touch on a touchscreen of the display device; capturing accelerometer data associated with the display device concurrent with receiving the input; determining a direction of the touch on the touchscreen; identifying a variability profile of an expected touch on the touchscreen of the display device, the variability model including an accelerometer model and a direction model; comparing the accelerometer data associated with the display device with the accelerometer model of the variability profile; comparing the direction of the touch on the touchscreen with the direction model of the variability profile; determining that the input is provided by a programmed device mimicking a human user responsive to one of the accelerometer data and the direction of the touch matching with the variability model that represents the programmed device; and storing the determination as analytics data in association with the application.

Implementations may include one or more of the following features. The computer implemented method where the touch on the touchscreen is one of a swipe, a tap, a pinch, and a drag on the touchscreen of the display device. The computer implemented method further including: capturing a pressure of the input including the touch on the touchscreen of the display device; and comparing the pressure of the input including the touch on the touchscreen to the variability profile that includes a pressure model. The computer implemented method where the variability profile is updated over time.

Other implementations of one or more of these aspects or other aspects include systems, apparatus, and computer programs, configured to perform various actions and/or store various data related to gesture fingerprinting. These and other implementations, such as various data structures, are encoded on tangible computer storage devices. Numerous additional and/or alternative features may in some cases be included in these and various other implementations, as discussed throughout this disclosure. It should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

DETAILED DESCRIPTION

Digital advertising campaigns on various different popular social networks can yield fraudulent clicks (up to 65% of the time in testing performed by applicant.) These fraudulent clicks translate into hundreds of millions of dollars lost to advertisers. As described in the background, these fraudulent clicks are often due to automated client devices ("bots") that are programmed to look like actual consumer clients on a network. Because of these bots, many companies advertising on the internet have no reliable way of knowing whether impression statistics provided by these various different popular social networks and/or other sites are valid or include fraudulent clicks.

The technology described in this document provides for human vs. bot detection using gestures fingerprinting. More particularly, the present disclosure relates to whether inputs are provided by a human or a bot, and provides for fraud and viewability detection addressing the above-described problem of knowing whether a bot created fraudulent clicks and/or views.

Figure 1:
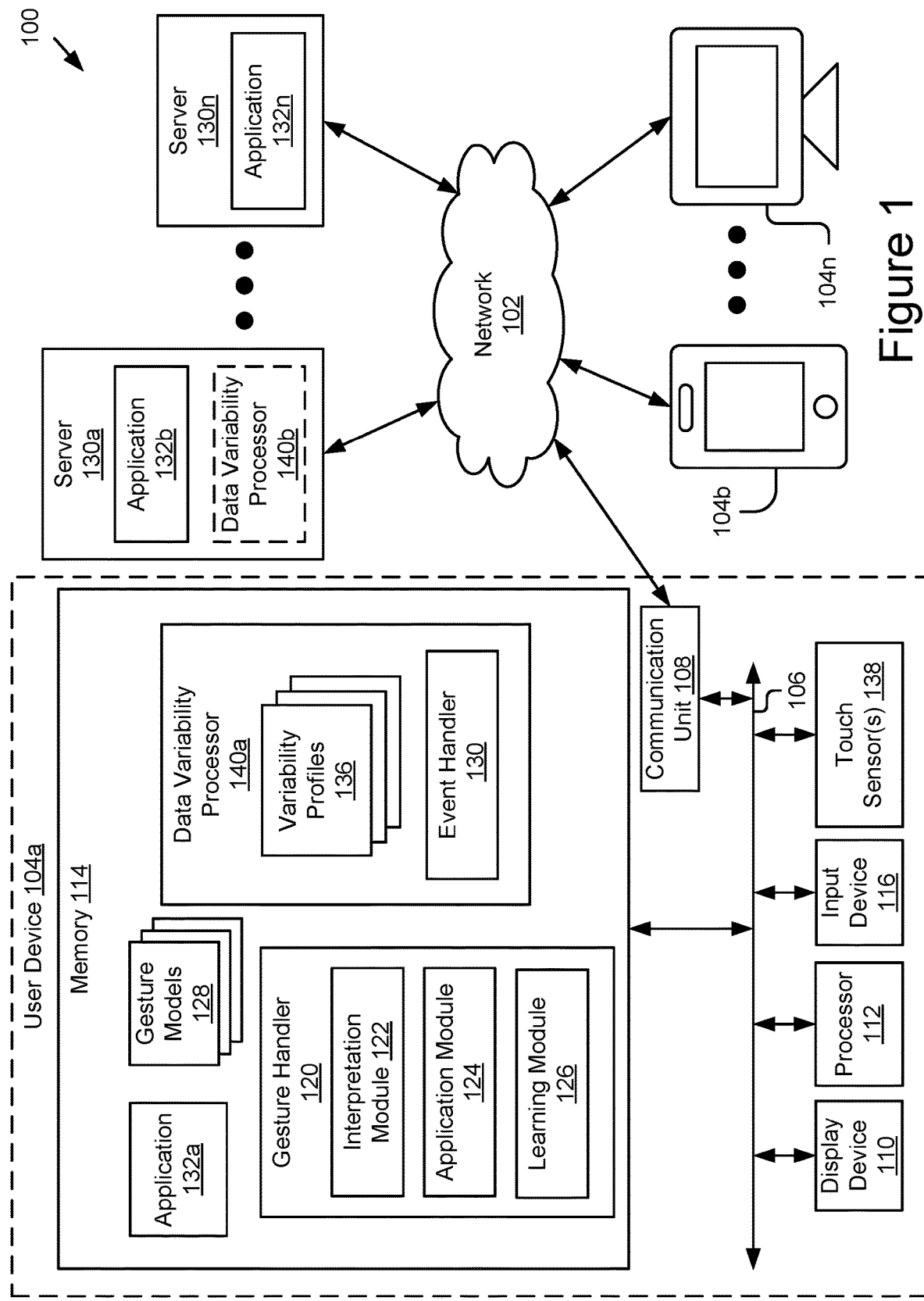
FIG. 1 is a block diagram illustrating an example system for human versus bot detection using gesture fingerprinting.

Furthermore, the present disclosure relates to gesture-fingerprinting technology that allows a computing application (also referred to herein as a user application) running on a computing device (also referred to herein as user device) to be self-adaptive and more responsive to varying user inputs (also referred to herein as gestures). As depicted in FIG. 1, the gesture fingerprinting technology may include a system 100 having a plurality of user devices 104a, 104b . . . 104n (also referred to individually and collectively as 104) coupled via a network 102. The system 100 also includes a plurality of servers 130a . . . 130n hosting a plurality of applications 132a . . . 132n. Each of the entities 104a . . . 104n and/or 130a . . . 130n may be coupled to the network 102 for cooperation and electronic communication with one another. The architecture illustrated in FIG. 1 is provided by way of non-limiting examples and it should be understood that numerous other configurations are possible and contemplated. For example, any number of computing devices (104 and/or 130) may be included in the system 100 and coupled to the network 102.

The network 102 may include any number of networks. For example, the network 102 may include, but is not limited to, one or more local area networks (LANs), wide area networks (WANs) (e.g., the Internet), virtual private networks (VPNs), mobile (cellular) networks, wireless wide area network (WWANs), WiMAX® networks, peer to peer (P2P) networks, close proximity communication networks (e.g., Bluetooth®, NFC, etc.), various combinations thereof, etc.

The user devices 104 are computing devices having data processing and communication capabilities. The user devices 104 may couple to and communicate with one another and the other entities of the system 100 via the network 102 using a wireless and/or wired connection. As depicted in FIG. 1, a user device 104 may include a processor 112, a memory 114, a display device 110, an input device 116, a communication unit 108, and a communication bus 106 that couples its constituent hardware components for communication/signaling purposes. However, it should be understood that the user devices 104 are not limited to the components illustrated in the user device 104a, and may include one or more other components including for example, a power source (e.g., battery), a GPS receiver; a Bluetooth® module, touch sensor(s) 138 (e.g., accelerometers, gyroscopes, thermocouples, magnetometers, microphones, image sensors, light sensors, etc.), graphics processor, firmware, operating systems for managing the hardware and resources of the user devices 104, drivers, various physical connection interfaces (e.g., USB, HDMI, etc.), etc. Non-limiting examples of a user device 104 include a smartphone, a tablet computer, a laptop computer, a netbook computer, a desktop computer (e.g., equipped with a touchscreen), a computing surface (e.g., a computer-enabled countertop, a tabletop, a wall, etc.), and/or any other computing devices capable of providing similar acts and/or functionality.

The memory 114 may store instructions and/or data that may be executed by the processor 112. In the depicted implementation, the memory 114 stores a user application 132; a gesture handler 120 including an interpretation module 122, an application module 124, and a learning module 126; a plurality of gesture models 128 as described below in further detail; a plurality of variability profiles 136 as described below in further detail; an event handler 130; a data variability processor 140; and a visibility processor 134. The memory 114 is also capable of storing other instructions and data, including, for example, an operating system, hardware drivers, other software applications, databases, etc. The memory 114 is coupled to the bus 106 for communication with the processor 112 and the other components of the user device 104.

The communication unit 108 may include one or more interfaces for communicating with other computing devices. For example, the communication unit 108 may include wireless network transceivers (e.g., Wi-Fi™, Bluetooth®, cellular), wired network interfaces (e.g., a CAT-type interface), USB, Firewire, or other known interfaces. The communication unit 108 may provide connections to the network 102 and to other entities of the system 100 using standard communication protocols. The communication unit 108 may link the processor 112 to the network 102, which may in turn be coupled to other processing systems.

The display device 110 may be a touch-screen display (e.g., OLED, AMOLED, etc.) capable of receiving input from one or more fingers of a user. For example, the display device 110 may be a capacitive touch-screen display capable of detecting and interpreting multiple points of contact with the display surface. The input device 116 may include touch sensitive component (e.g., a transparent touch sensitive layer) that is integrated with the display device 110 and capable of sensing input/gestures from the one or more fingers of a user. Additionally or alternatively, the input device 116 may also include a microphone, a front facing camera, a rear facing camera, and/or other motion sensors. Non-limiting examples of gestures and/or inputs that the input device 116 may be capable of receiving include a single touch gesture (i.e., swipe, tap, flick, stroke), a multiple touch gesture (i.e., zoom, grab), a mouse click, a keyboard stroke, a voice gesture (e.g., speech to text, voice command), a motion gesture (i.e., hand signal, body signal, eye movement), etc.

The user application 132 may be stored in the memory 114 and accessible and executable by the processor 112 of the user device 104 to provide for user interaction, and to send and receive data via the network 102. In particular, the user application 132 is code operable to instruct the user device 104 to render user interfaces, receive user inputs, and send information to and receive information from the server 130, and the other entities of the system 100. Non-limiting examples of the user application 132 may include web browsers, apps, multimedia applications, messaging applications (e.g., email, SMS, chat, video, etc.), video games, word processing applications, operating systems, operating system interfaces, etc.

Figure 3A:
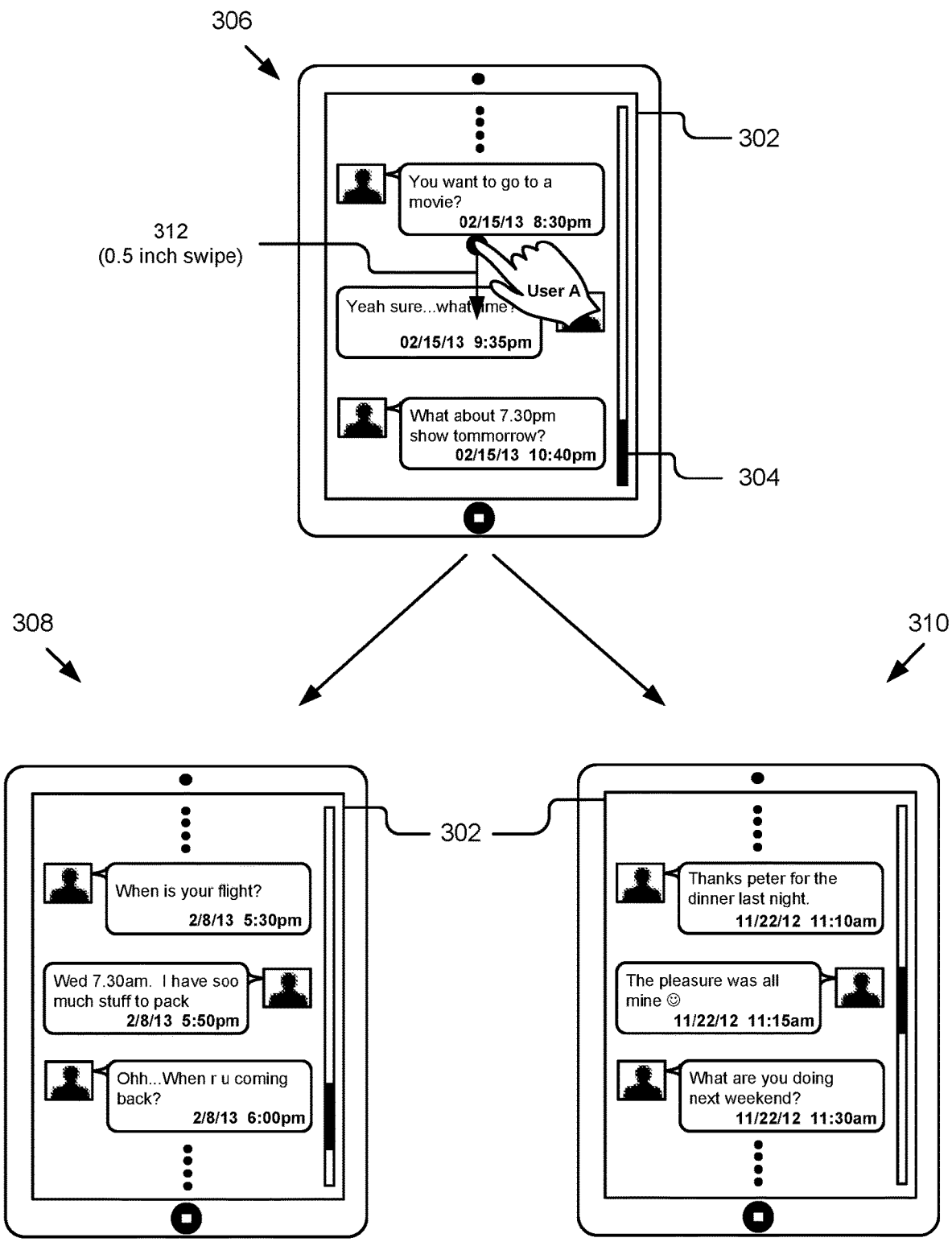
FIGS. 3A and 3B are graphic representations of example user interfaces for viewing a conversation thread between two or more users.
Figure 3B:
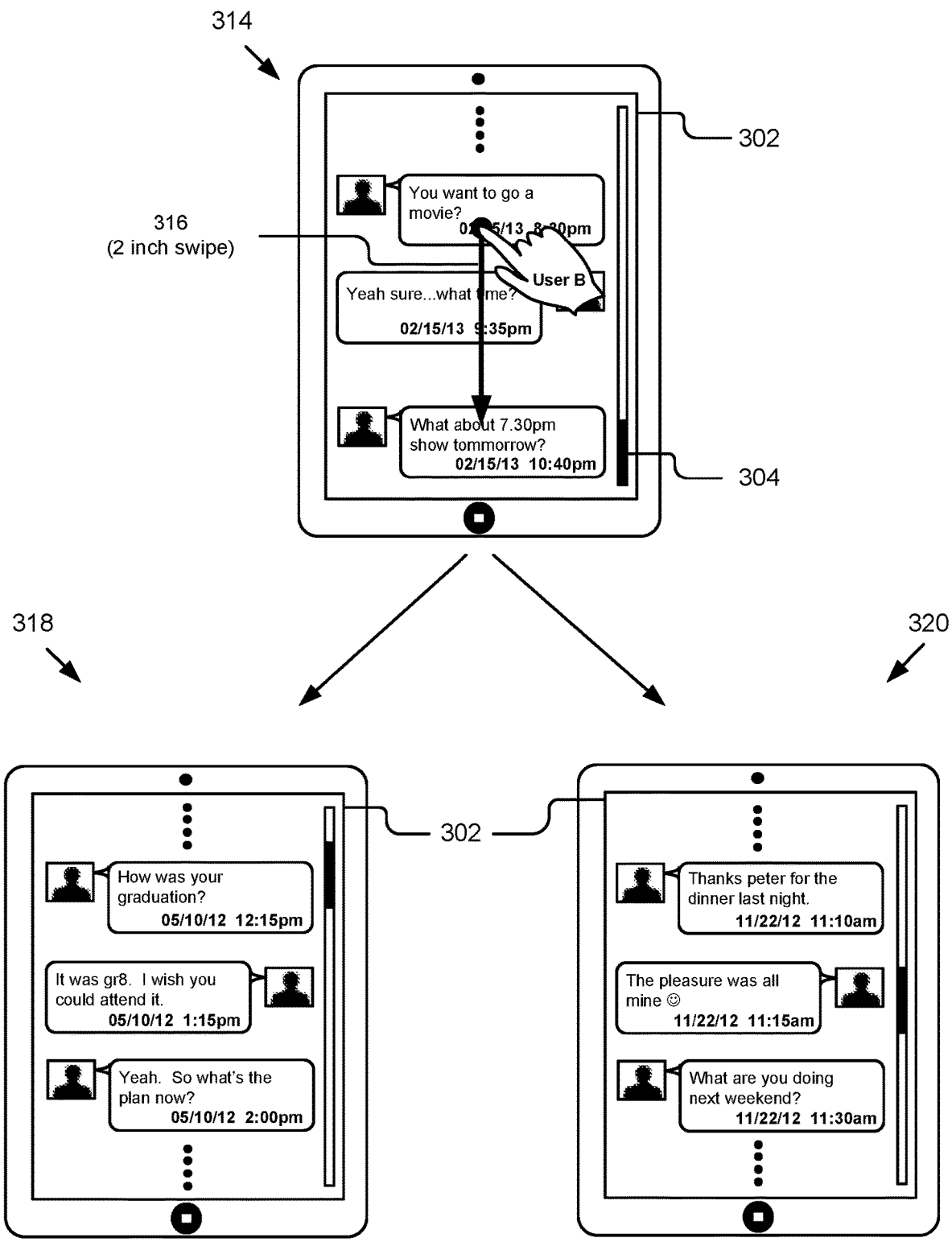

The user application 132 may generate and present user interfaces to a user of the user device 104 via the display device 110. For example, the user application 132 may generate and present the user interfaces as depicted in FIGS. 3A-B. In some implementations, the user application 132 receives the user instructions using mark-up language (e.g., HTML, XML, etc.), style sheets (e.g., CSS, XSL, etc.), graphics, and/or scripts (e.g., JavaScript, ActionScript, etc.).

In some instances, the user application 132 receives user input/gestures from a user via the input device 116 of the user device 104, and provides the received input/gesture to the gesture handler 120 for processing. The user application 132 may be communicatively coupled to the gesture handler 120 (e.g., via the processor 112 and/or the bus 106).

The applications 132 may transmit electronic files and/or data embodying the services they provide to the user devices 104 for rendering. In some implementations, the electronic files and/or data streams may be formatted using a markup language(s) (e.g., HTML, XML, etc.), style sheet(s) (e.g., CSS, XSL, etc.), graphic(s) (e.g., PNG, JPG, GIF, etc.), and/or scripts (e.g., JavaScript, ActionScript, etc.), and the user devices 104 may interpret and/or execute the electronic files and/or data streams and render an interactive Web User Interface (WUI) for presentation to users on display device 110. Users may input gestures to manipulate these user interfaces, and the gesture handler 120 may process and optimize these gestures as discussed elsewhere herein.

The gesture models 128 represent the different variations of gestures that can be performed by users when using their user devices. In some implementations, a given gesture model is initially patterned after how a segment of users tend to input a particular gesture. For example, a first gesture model 128 may be configured for younger users who may tend to softly tap a display in order to select a user interface element (e.g., a button) and a second gesture model 128 may be configured for older users who tend to press the display with a substantial amount of force in order to select the same user interface element.

The gesture models 128 may include models for any type of user gesture and/or its variations. For instance, the gesture models 128 may include, without limitation, models for a soft tap, a hard tap, a flick (e.g., an abrupt, short swipe), a throw (e.g., a hard, long swipe), small, medium, and large pinches, etc. The gesture models 128 may be stored in a data store, such as the memory 114 of the user device 104, for later matching, application, and optimization, as discussed in further detail below. The interpretation module 122, the application module 124, the learning module 126, the gesture handler 120, and/or other components thereof, may be coupled to the data store, such as the memory 114, to manipulate (e.g., retrieve, update, delete, store, etc.) the gesture models 128, gesture profiles associated with the gesture models 128, user input, learning data, etc.

The gesture handler 120 includes software, logic, and/or routines for receiving and handling a user gesture, determining a suitable gesture model 128 based on the gesture, and optimizing the gesture model 128 based on subsequent user gestures that are received. As depicted in FIG. 1, the gesture handler 120 may include the interpretation module 122, the application module 124, and the learning module 126, although other arrangements are possible. For example, an alternative arrangement could combine the functionality of one or more of the components 122, 124, and/or 126 into a single component, or further divide the modules into separate additional cooperative components.

The gesture handler 120, and/or the interpretation module 122, the application module 124, and the learning module 126, and/or other components thereof, may be embodied by software stored in one or more memories (e.g., the memory 114 of the user device 104) that is accessible and executable by one or more processors (e.g., the processor 112) to perform the acts and/or functionality described herein. The gesture handler 120, and/or the interpretation module 122, the application module 124, and the learning module 126, and/or other components thereof, may be communicatively coupled to one another to send and receive data, such as gesture models 128, gesture profiles, user input, and/or any other data discussed herein.

In further implementations, the gesture handler 120, and/or the interpretation module 122, the application module 124, and the learning module 126, and/or other components thereof, may be implemented as executable software and/or hardware. For instances, one or more of these components may comprise logic embodied by and/or executable via one or more programmable logic devices (e.g., FPGA, PLA, PLD, etc.), application-specific integrated circuits, systems-on-a-chip, application-specific instruction-set processors, etc. Other suitable variations are also contemplated.

The interpretation module 122 includes software, logic, and/or routines for interpreting user gestures and attributes. The interpretation module 122 may interpret a user gesture in response to receiving an input from a user on the user device 104. In some implementations, the interpretation module 122 may determine, using the data from the input, the number of points of contact with a touchscreen, whether those points of contact are static or dynamic (e.g., have velocity), and/or further attributes associated with each point of contact, such as but not limited to, force/intensity, length of time in contact, distance moved, trajectory, path traveled, intermittence, and so forth. Based on one or more of these attributes, the interpretation module 122 may determine what type of gesture was used. The interpretation module 122 may be coupled to the user application 132, the input device 116, and/or another component to receive the inputs provided by a user.

The application module 124 includes software, logic, and/or routines for matching a gesture to a suitable gesture model based on one or more of the gesture attributes received from the interpretation module 122, and then applying the gesture model to current and/or future inputs received by the user. To match a gesture to an appropriate gesture model, the application module 124 may analyze the one or more attributes that characterize the gesture to determine which variation of the gesture was used. By way of further example, the application module 124 may determine a gesture to be: a hard-tap variant based on a "tap" gesture type and a high level of force compared to a baseline average; a soft-tap variant based on a "tap" gesture type and a low level of force compared to a baseline average; flick-swipe variant based on a "swipe" gesture type, a comparatively small amount of pressure and/or path length of the point of contact, and a comparatively high velocity of the point of contact; a throw-swipe variant based on a "swipe" gesture type and a comparatively large amount of pressure and/or path length of the point of contact; and so on.

Once the gesture variation is determined, the application module 124 may match the gesture type and variation to the set of gesture models 128 stored in the memory 114 to find a match. For example, the gesture models 128 may be indexed by one or more of gesture type, gesture variation, gesture attributes, etc., and the application module 124 query the gesture models 128 using one or more of these criteria to find a match. If a match is not found, the application module 124 may match a default or closest-approximate gesture model 128 to the gesture. In some implementations, the gesture models 128 may be pre-defined and stored in the memory 114.

In some implementations, the application module 124 may maintain gesture profiles for the users of a user device 104. When a given gesture model 128 is determined to apply to a gesture of the user, that gesture model 128 may be added by the application model 124 to the user's gesture profile and then applied when performing an action associated with the gesture. For instance, the application module 124 may signal a rendering engine (not shown) to render a navigational effect (e.g., scroll, zoom, display, animate, etc., content) in a manner that is unique to the user based on the user's gesture profile. By way of illustration, the gesture profile for an elderly user may indicate that the elderly user has trouble with rapid animation effects and, based on this profile, the rendering engine may animate the content being displayed at a slower pace that is optimized to the elderly user. The rendering engine (not shown) may be coupled to a display of the display device 110 to provide content for display to the user.

The user gesture profiles may be temporary or may be stored on a more permanent basis for later access and application. For example, upon user login, the application module 124 may apply that user's gesture profile so that the system 100 does not have to re-interpret the user's gesture behavior and/or re-determine which gesture models 128 apply to that user. Over time, as the user's behavior is further analyzed and/or changes, that user's gesture profile may be modified (added to, subtracted from, optimized, etc.) to reflect those changes (e.g., by the application module 124 and/or the learning module 126).

The learning module 126 includes software, logic, and/or routines for optimizing the applied gesture model(s) 128, gesture profile, and/or variability profiles based on learning performed on subsequent gestures and/or inputs received from the user and/or a programmed device. In some implementations, the learning module 126 may receive gesture-related information as interpreted by the interpretation module 122 and compare that information to the gesture models 128 applied by the application module 124 to determine if the proper gesture models 128 have been applied, whether one or more variables of algorithms used by the applied gesture model(s) 128 need to be adjusted to better predict the intentions of the user, etc. By way of further non-limiting example, the learning module 126 may determine how many pinch-to-zoom gestures a given user must use to zoom completely out in a given view, and whether the number of zoom gestures used is excessive as compared to a baseline. If so, the learning module 126 may adjust the applied pinch-to-zoom gesture model 128 to zoom out more each time the user inputs that gesture to improve that user's overall user experience (by not requiring the user to zoom as much to reach the same result). In some implementations, if the learning module 126 determines that the applied user model 128 for a given gesture is incorrect, the learning module 126 may signal the application module 124 to apply a more appropriate gesture model by indicating a new gesture type and/or variation.

The data variability processor 140 includes software, logic, and/or routines for receiving an input, comparing that input to one or more variability profiles 136, and determining if the input is from a human user or a programmed device (e.g., a bot). As depicted in FIG. 1, the data variability processor 140*a* may include the variability profiles 136 and the event handler 130, although other arrangements are possible. For example, an alternative arrangement could combine the functionality of one or more of the components 136 and 130 into a single component, or further divide the modules into separate additional cooperative components.

The data variability processor 140, and/or the variability profiles 136, the event handler 130, and/or other components thereof, may be embodied by software stored in one or more memories (e.g., the memory 114 of the user device 104) that is accessible and executable by one or more processors (e.g., the processor 112) to perform the acts and/or functionality described herein. The data variability processor 140, and/or the variability profiles 136, the event handler 130, and/or other components thereof, may be communicatively coupled to one another to send and receive data, such as the variability profiles 136, user input, and/or any other data discussed herein.

In further implementations, the data variability processor 140, and/or the variability profiles 136, the event handler 130, and/or other components thereof, may be implemented as executable software and/or hardware. For instances, one or more of these components may comprise logic embodied by and/or executable via one or more programmable logic devices (e.g., FPGA, PLA, PLD, etc.), application-specific integrated circuits, systems-on-a-chip, application-specific instruction-set processors, etc. Other suitable variations are also contemplated.

The data variability processor 140 may include software and/or logic to cause one or more input devices 116 (such as an accelerometer, pressure sensor, touchscreen, etc.) to capture sensor data when an input is received. The data variability processor 140 may include software and/or logic to analyze the sensor data to detect a variance in the sensor data. In some implementations, the data variability processor 140 may be programmed to compare the sensor data to a model (such as a variability profile 136) that includes variance criteria represented as an expectation of what the sensor data could look like for a type of input (such as a tap, touch, swipe, etc.) and identify a variance that deviates from the variance criteria. In some implementations, the data variability processor 140 may be programmed to determine whether the variance that deviates from the variance criteria classifies the input as coming from a human user or a bot, such as if the variance exceeds a threshold expected from a bot and the data variability processor may classify the input as coming from a human user.

The variability profiles 136 may represent the different variations of inputs that can be performed by users when using their user devices 104 and may include classifications for different types of inputs (such as a tap, swipe, pinch, etc.), different types of input devices 116 (such as different models of user devices with different sensor configurations and/or accuracy), etc. In some implementations, a given variability profile 136 is initially patterned after how a segment of users tend to input a particular input and/or gesture. In some implementations, the variability profiles 136 may be updated as inputs are received and corrected, such as by using machine learning or receiving updates from the learning module 126.

The event handler 130 may include software and/or logic to cause the data variability processor 140 to cause the sensors 116 to capture sensor data or cause the data variability profile 140 to determine whether an input is from a human user or a bot responsive to an event occurring, such as an input received in association with an application.

The servers 130*a* . . . 130*n* (also referred to individually and collectively as 130) may each include one or more computing devices having data processing, storing, and communication capabilities. For example, a server 130 may include one or more hardware servers, server arrays, storage devices and/or systems, etc. In some implementations, the servers 130*a* . . . 130*n* may include one or more virtual servers, which operate in a host server environment and access the physical hardware of the host server including, for example, a processor, memory, storage, network interfaces, etc., via an abstraction layer (e.g., a virtual machine manager).

In the depicted implementation, the servers 130*a* . . . 130*n* include applications 132*a* . . . 132*n* (also referred to individually and collectively as 132) operable to provide various computing functionalities, services, and/or resources, and to send data to and receive data from the other entities of the network 102, such as the user devices 104. For example, the application 132 may provide functionality for user account management, internet searching; social networking; web-based email; word-processing; banking; finance; blogging; micro-blogging; photo management; video, music and multimedia hosting, distribution, and sharing; business services; news and media distribution; any combination of the foregoing services; etc. It should be understood that the server 130 is not limited to providing the above-noted services and may include other network-accessible services.

In some implementations, the servers 130*a* . . . 130*n* may additionally include an embodiment of the data variability processor 140*b* which includes all of the features of the data variability processor 140*a* described above, but may be located on a server 130*a* instead of the user device 104*a*. In further implementations, portions of the data variability processor 140 may be present on the server 130*a* while additional components may be present on the user device 104*a* and processing of the functions of the data variability processor 140 may be shared between the server 130*a* and the user device 104*a*.

Figure 2:
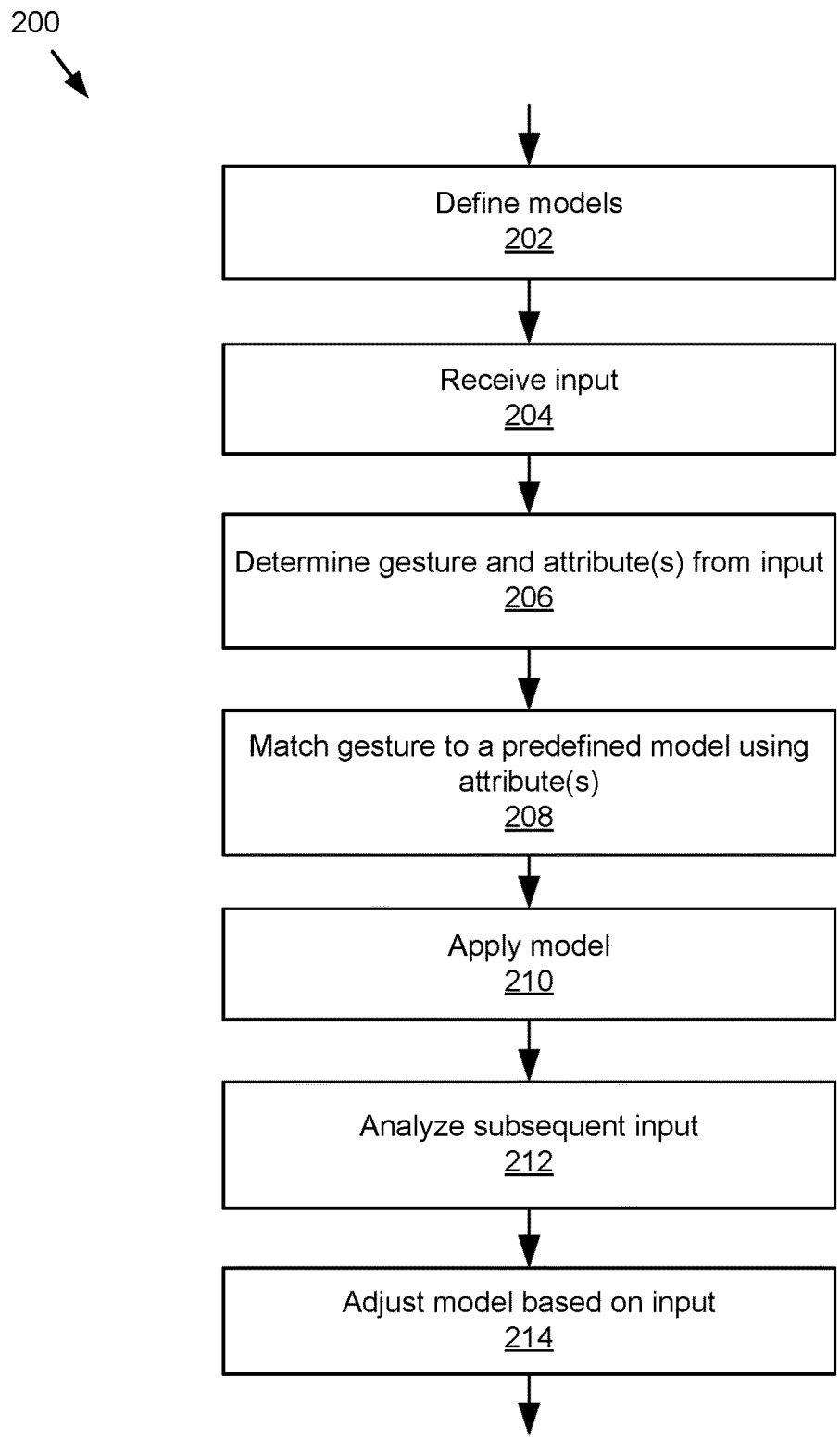
FIG. 2 is flowchart of an example method for gesture fingerprinting.

FIG. 2 is a flowchart of an example method 200 for gesture fingerprinting. In particular, FIG. 2 is a flowchart for determining a suitable gesture model based on a user input and adjusting the model using subsequent user input. The method 200 may begin by defining 202 gesture models 128. In some implementations, the gesture models 128 may be predefined. For example, the gesture models 128 may be manually defined and stored in the memory 114 in the manner discussed above with respect to the application module 124.

The method 200 may continue by receiving 204 an input (e.g., a gesture) from a user, such as a touch-based gesture (e.g., tap, swipe, zoom, grab, drag, etc.) input by the user into a user interface generated and presented by the user application 132. In some implementations, the user application 132 and/or the input device 116 may receive the user input/gesture, and may signal the interpretation module 122 to interpret the gesture that the user has input. Upon receiving the input, the interpretation module 122 may further determine 206 the gesture and one or more attributes thereof, as discussed elsewhere herein.

The method 200 may then match 208 the gesture to a pre-defined gesture model 128 stored in the memory 114 based on the gesture attributes. In some implementations, the application module 124 may analyze the gesture attributes to determine the variation of the gesture and then query the memory 114 for a matching gesture model 128 based thereon. In some implementations, responsive to identifying a suitable gesture model 128 for the user, the method 200 may apply 210 the model to the current gesture and/or subsequent gestures being received and interpreted to improve the how the user application 132 responds to receiving user input.

For instance, in block 212, the method 200 may analyze subsequent gestures input by the user, and based thereon, may adjust 214 the gesture model 128 (e.g., improve or adapt the gesture model 128, change to a different gesture model 128, etc.) to improve performance. In some implementations, this machine learning may be performed by the learning module 126, as discussed elsewhere herein. By way of further illustration, if a given user uses long and hard swipes to scroll through a chat history, and it takes the user over five swipes to reach to top of the history thread, then the learning module 126 may optimize the applied swipe gesture model 128 so it scrolls the thread further with each swipe. This is advantageous because it allows the user to reach his/her desired destination using an optimized number of gestures (e.g., not too few and not too many) as defined by a pre-determined baseline stored in the memory 114.

FIGS. 3A-B are graphic representations of example user interfaces 302 for viewing a conversation thread between two or more users. FIG. 3A shows a user (e.g., user A) who has the tendency to perform small swipes (flicks) to scroll the thread while FIG. 3B shows a user (user B) who has a tendency to perform long swipes (throws) to scroll the thread.

Referring to FIG. 3A, in stage 306, the scroll bar 304 is at the bottom of the conversation thread and the user A is inputting a short (e.g., 0.5 inch) downward swipe gesture 312 to scroll upward in the conversation thread. Stage 308 illustrates a case where the user interface 302 does not scroll far enough upward because of the shortness of the swipe gesture 312. This can be caused by a gesture model 128 being used that is not adapted to the specific gesture attributes of the user. In contrast, state 310 shows that the user interface 302 scrolls a more appropriate distance when a gesture model 128 adapted to the user's short gesture attributes is applied by the system 100.

Similarly, referring to FIG. 3B, in stage 314, the scroll bar 304 is at the bottom of the conversation thread and the user A is inputting a long (e.g., 2 inch) downward swipe gesture 316 to scroll upward in the conversation thread. Stage 318 illustrates a case where the user interface 302 scrolls too far because of the length of the swipe gesture 316. This can be caused by a gesture model 128 being used that is not adapted to the specific gesture attributes of the user. In contrast, state 318 shows that the user interface 302 scrolls a more appropriate distance when a gesture model 128 adapted to the user's long swipe gesture attributes is applied by the system 100.

Figure 4:
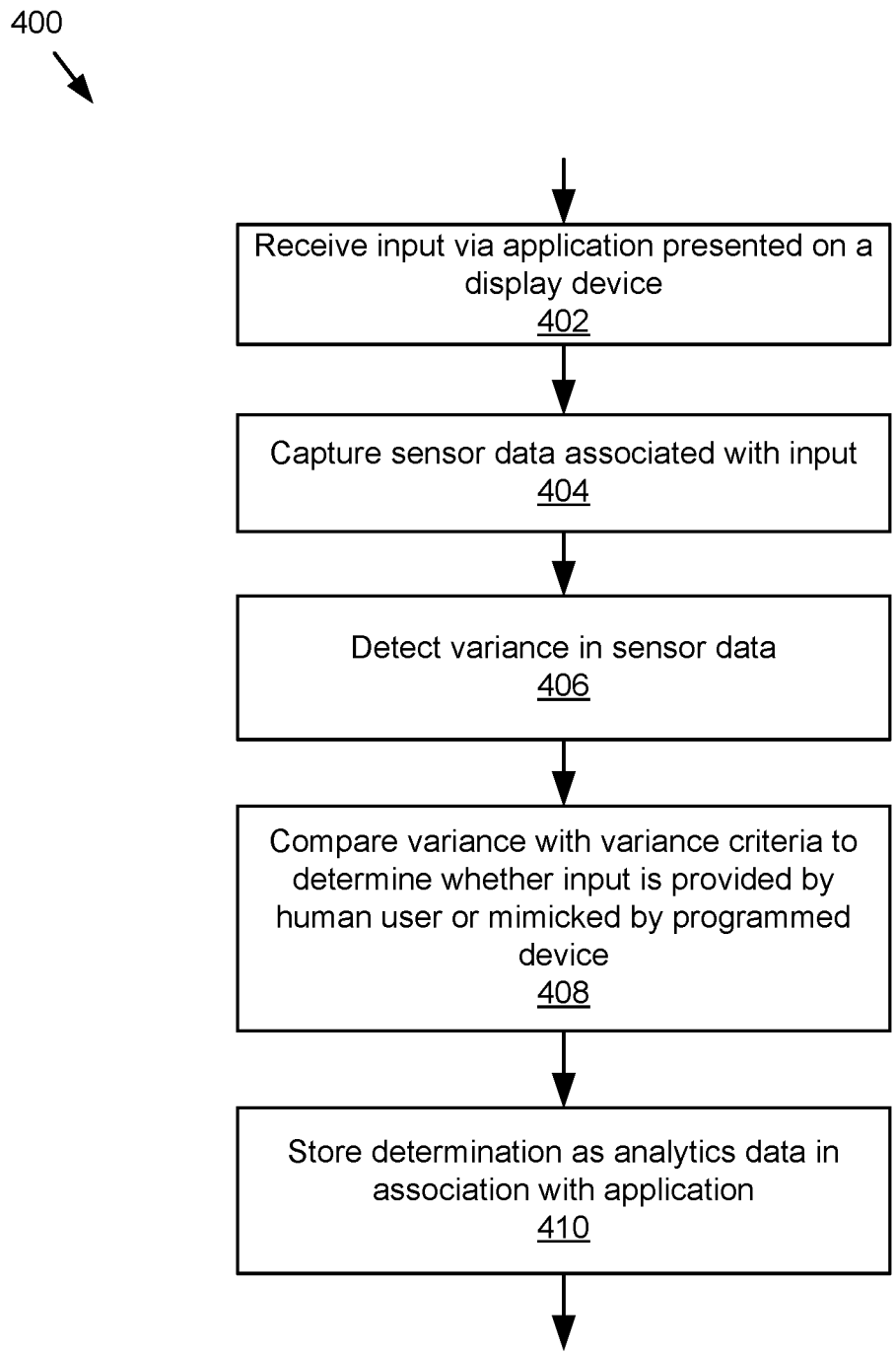
FIG. 4 is a flowchart of an example method for human versus bot detection using gesture fingerprinting.

FIG. 4 is a flowchart of an example method 400 of human versus bot detection using gesture fingerprinting. At 402, the data variability processor 140 may receive an input via application 132. In some implementations, the application 132 may be presenting a graphical user interface ("GUI") on a user device 104. For example, the input may be a touch input on a touchscreen of the user device 110. In further implementations, the input may include a touch input, a voice command, a selection via another graphical element (e.g., an icon, mouse pointer, keystroke, etc.), a video or image captured by a camera of the user device 104, etc. In some implementations, the input may be a user interacting with an element of the display device 110, such as an icon in the GUI, while in further implementations, the input may be a scrolling or moving input that causes the GUI to display additional content, such as a user scrolling with their finger as they read an article or view a webpage, etc.

At 404, the data variability processor 140 may cause the input device 116 and/or the sensors 138 to capture sensor data associated with the input. For example, the sensors 138 may include accelerometer sensors that capture a move and/or rotation of the display device 110 as the input is received. In another example, the sensors 138 may include a pressure sensor of the touchscreen of the display device 110 that can capture the pressure of the input, such as the pressure of a swipe at various points of the swipe on the touchscreen. In some implementations, the sensor data may only be captured when the data variability processor 140 directs the sensors 138 to capture data. In further implementations, the sensors 138 may continuously capture data and the data variability processor 140 may receive the captured data when requested (such as when an input is received).

At 406, the data variability processor 140 may detect a variance in the sensor data captured by the sensors 138. The variance may be a change and/or deviation in the data that is different than the rest of the sensor data. In further implementations, the variance may be detected by comparing the sensor data to a model of expected input data, such as a variability profile. For example, the input may be a user touching the screen to swipe down the touchscreen and the variance may be portions of the swipe where the input deviates from the general direction of the swipe. Such as the bottom of the swipe curving, or small deviations in the straightness of the swipe caused by a user's hand/finger shaking during input (even minute deviations caused just by the minor tremors in a user's hand/finger may be detectable data variability processor 140 comparing pixels of the input or an accelerometer detecting minor changes in the position of the display device).

At 408, the data variability processor 140 may compare the variance with a variance criteria to determine whether the input is provided by a human user or mimicked by a programmed device (e.g., a bot). In some implementations, the variance criteria may include predefined variances that may signal whether an input should be classified as a user input or a bot input. The predefined variances of the variance criteria may include a straightness threshold of the input, a position of the input, a threshold of deviations in the accelerometer data, a threshold of deviations in a pressure input, a sound threshold, etc. For example, the data variability processor 140 may compare a touch input to a variability profile of a touch input by a bot and determine that a touch input is from a human user because of the deviations in the input compared to the variability profile of the touch input by the bot. In another example, the data variability profile 140 may compare the accelerometer data of a touch input to a variability profile of accelerometer data representing a human user and determine that the accelerometer data of the touch input includes deviations that match with the variability profile and classify the touch input as coming from a human user. In some implementations, the data variability processor 140 may determine when an input is being mimicked by the programmed device, e.g., a bot, based on the sensor data and the variances (or lack of variances) in the sensor data not matching an expected model of a human user input. In some implementations, the sensor data may include a location or position of the touch on the touchscreen. The data variability processor 140 may analyze the location or position of the touch and infer whether that location or position is consistent with a human user. For example, a human user will generally not scroll along the exterior edges of a display screen or swipe in awkward ways. The data variability processor 140 may use the gesture models 128 to identify which input locations or positions are expected and which are unexpected based on the previously collected gesture data.

In some implementations, the data variability processor 140 may infer if the input is from a human user or a bot based on multiple sensor data, such as both accelerometer and touch data. By combining multiple data from different sensors a higher level of accuracy in determining if the input is from a human or a bot because of the additional information. In some implementations, the data may be analyzed by the data variability processor 140 to infer more than just the deviations in the data. For example, the data variability processor 140 may be able to analyze the sensor data and infer when the data is outside of what would be expected from a human user. Such as an input that individually would be classified as from a human user but when compared over multiple inputs and a larger period of time may be identified as a repetitive or awkward input for a human user to do, but would be possible for a bot, such as a similar or identical scrolling input for a larger period of time. In some implementations, as the data variability processor 140 analyzes the sensor data and infers if inputs are from humans or bots, the data variability processor 140 may also incorporate machine learning and analysis on the data sets to update the variability profiles 136 over time as described elsewhere herein.

In some implementations, the data variability processor 140 may be able to identify models and/or types of user devices 104 and compare inputs on specific user devices 104 to expected variability profiles 136 that represent an input on that specific user device 104. This may allow for differences in sensor data between different devices and different configurations of sensor 138 capabilities and accuracies.

At 410, the data variability processor 140 may store the determination of whether the input is provided by a human or mimicked by a programmed device. The determination may be stored as analytics data in association with the application. In some implementations, the analytics data may be retrieved for analysis at a later time. For example, if the application includes a GUI that includes content, such as an advertisement, the analytics data may be retrieved for the specific application and it could show over a period of time, how many of the interactions/views of the GUI were by a human user and how many were from a bot. This information may be valuable for advertisers that would be able to receive accurate and trusted data of how many actual views were counted for their paid advertising.

Figure 5:
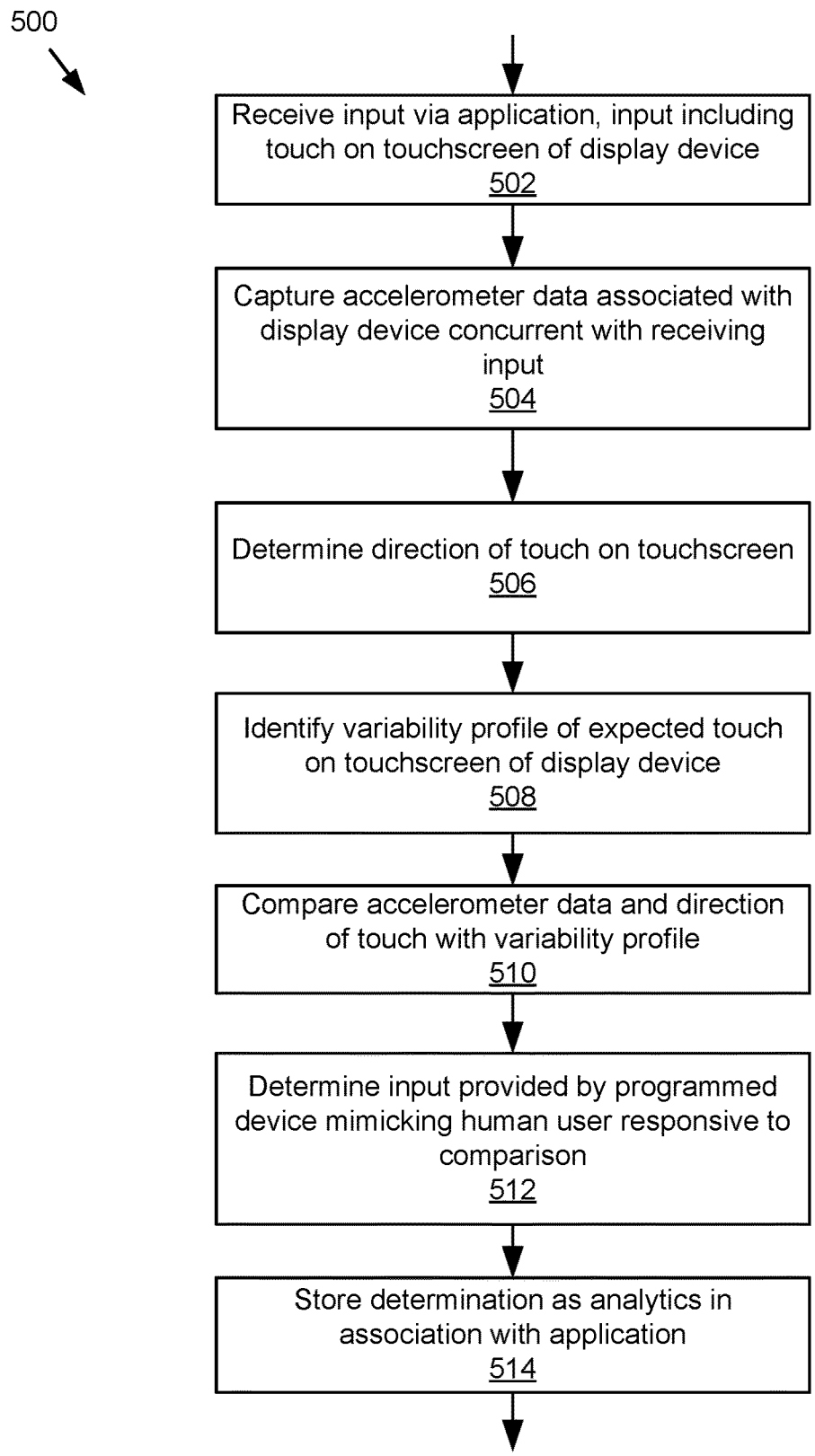
FIG. 5 is a flowchart of an example method of human versus bot detection using gesture fingerprinting.

FIG. 5 is a flowchart 500 of an example method for determining an input source using gesture fingerprinting. At 502, the data variability processor 140 may receive an input associated with an application and the input may represent a touch on a touchscreen of a display device 110. For example, the input may be a swipe by a user to cause a GUI of the application to scroll down and reveal additional content.

At 504, the data variability processor 140 may capture accelerometer data from an accelerometer associated with the display device 110 concurrently with receiving the input. For example, the input may be the swipe and as the user swipes on the touchscreen, the display device 110 may shift or move (even just subtle movements) as the user applies pressure to the touchscreen. In another example, the accelerometers may be sensitive enough to detect movement of the display device 110 when the display device 110 is resting on a surface, such as a table, as the input is swiped along the screen. In some implementations, the accelerometer data may include multiple accelerometers at different positions in the display device 110. In some implementations, the accelerometers may also capture data before and/or after the reception of the input to allow for comparisons of the motions of the display device 110 before, during, and/or after the input is received.

At 506, the data variability processor 140 may determine a direction of a touch on a touchscreen. In some implementations, the data variability processor 140 may determine a direction by mapping the input and identifying a direction based on a mapping. The data variability processor 140 may be able to characterize the direction of the input based on a general direction of the input, such as a swipe down by a user (which may not be and usually isn't perfectly straight down). In some implementations, the data variability processor may analyze the mapping of the touch and determine deviations in the mapping, such as where the line changes directions or wiggles.

At 508, the data variability processor 140 may identify a variability profile of an expected touch on a touchscreen of the display device. In some implementations, the data variability processor 140 may be able to identify a type or brand of the user device 104 and may be able to identify a variability profile based on that specific type or brand of user device 104. In some implementations, the data variability processor 140 may be identified based on the specific expected inputs.

At 510, the data variability processor 140 may compare the accelerometer data and the direction of the touch with the identified variability profile. In some implementations, the variability profile may include models of accelerometer data and directions of the touch and the accelerometer data and direction of the touch may be compared to the models of the variability profile. In some implementations, the data variability processor 140 may compare the data to determine if the data matches with the models or if the deviations in the data exceed thresholds for determining if the data represents a human user or a bot.

At 512, the data variability processor 140 may determine that the input is provided by the programmed device and is mimicking the human user responsive to the comparison. For example, if the input is a swipe and the comparison shows that the accelerometer model representing a human user includes deviations in the accelerometer data while the bot model does not include deviations in the accelerometer data and the accelerometer data does not include any or minimal deviations, then the data variability processor 140 can infer that the input is from a bot. In a further example, if the input is the swipe and the comparison shows that the direction of the touch in the human user model includes deviations while the direction of the touch in the bot model is straight and the direction of the touch is straight, then the determination by the data variability processor 140 is that the input is from a bot.

At 514, the data variability processor 140 may store the determination as analytics in association with the application. The analytics may be stored in memory 114 and may be accessible for later analysis. Such as to show the overall inputs with a specific application and how many inputs are from a human user versus a bot.

Figure 6:
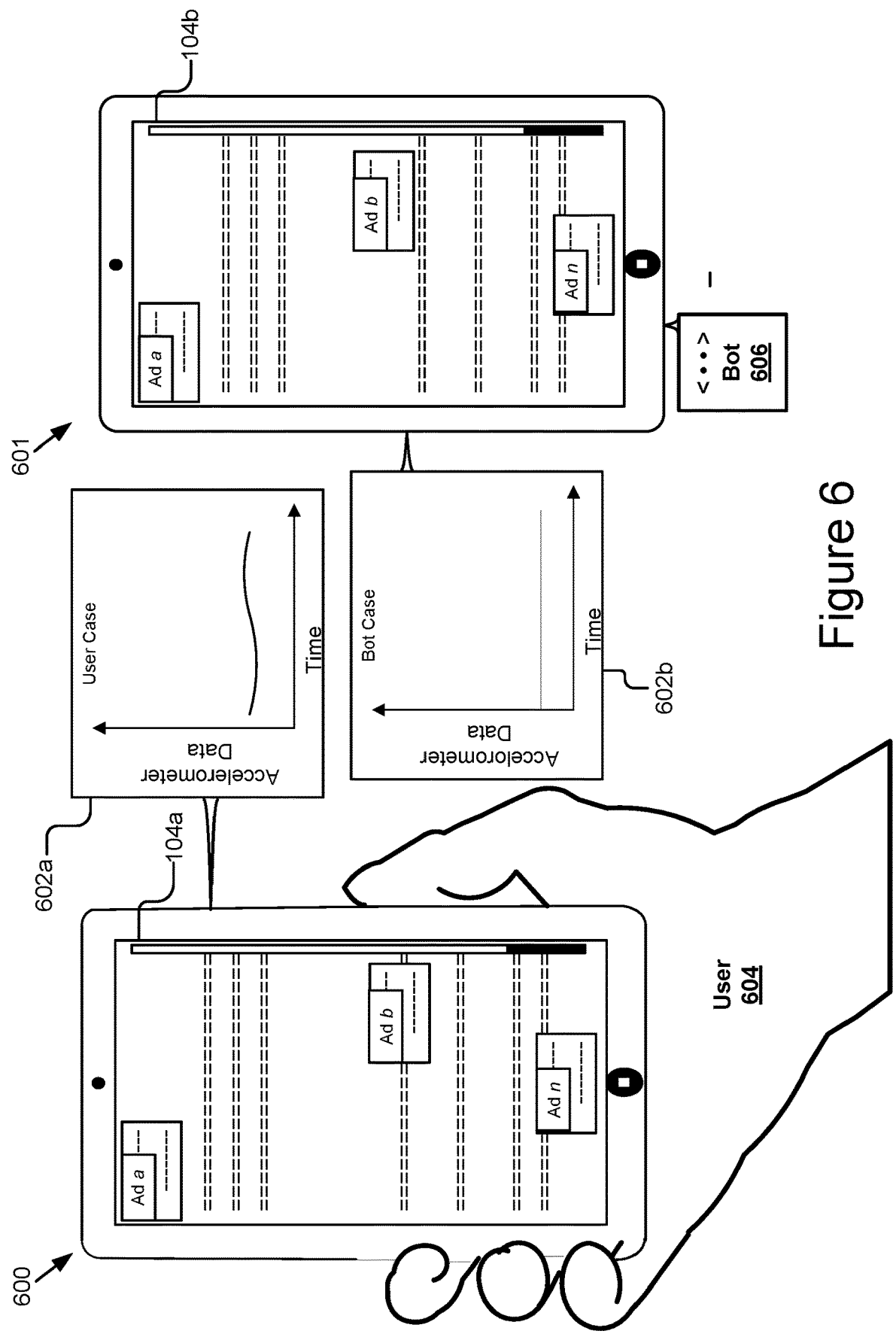
FIG. 6 is a graphical representation of an example user interface of a human input versus a bot input.

FIG. 6 is a graphical representation of an example user interface of a human input 600 versus a bot input 601. As shown in FIG. 6, a user 604 may be using a user device 104*a* that includes a GUI with advertisements a-n. As shown in graph 602*a*, the accelerometer data over time for the user 604 may include deviations and changes. For example, when a user is holding the user device 104*a* while viewing the display device 110, motions by the user 604 may cause the accelerometer of the user device 104*a* to capture that motion over time. These captured motions by the accelerometer may be used by the data variability processor 140 to determine that the user 604 is viewing the content.

As shown in FIG. 6, the bot 606 may be interacting with the content of user device 104*b*. In some implementations, the bot may be interacting with software representing the application running on the user device 104*b*, rather than with the actual user device 104*b*. As shown in graph 602*b*, the accelerometer data over time for the bot 606 may include no (or minimal) deviations and changes to the accelerometer data over time. Since the bot 606 isn't causing motion on the user device 104*b*, the accelerometer does not detect any motion and the data variability processor 140 can determine from the accelerometer data that the bot 606 provided an input rather than the user 604.

Figure 7:
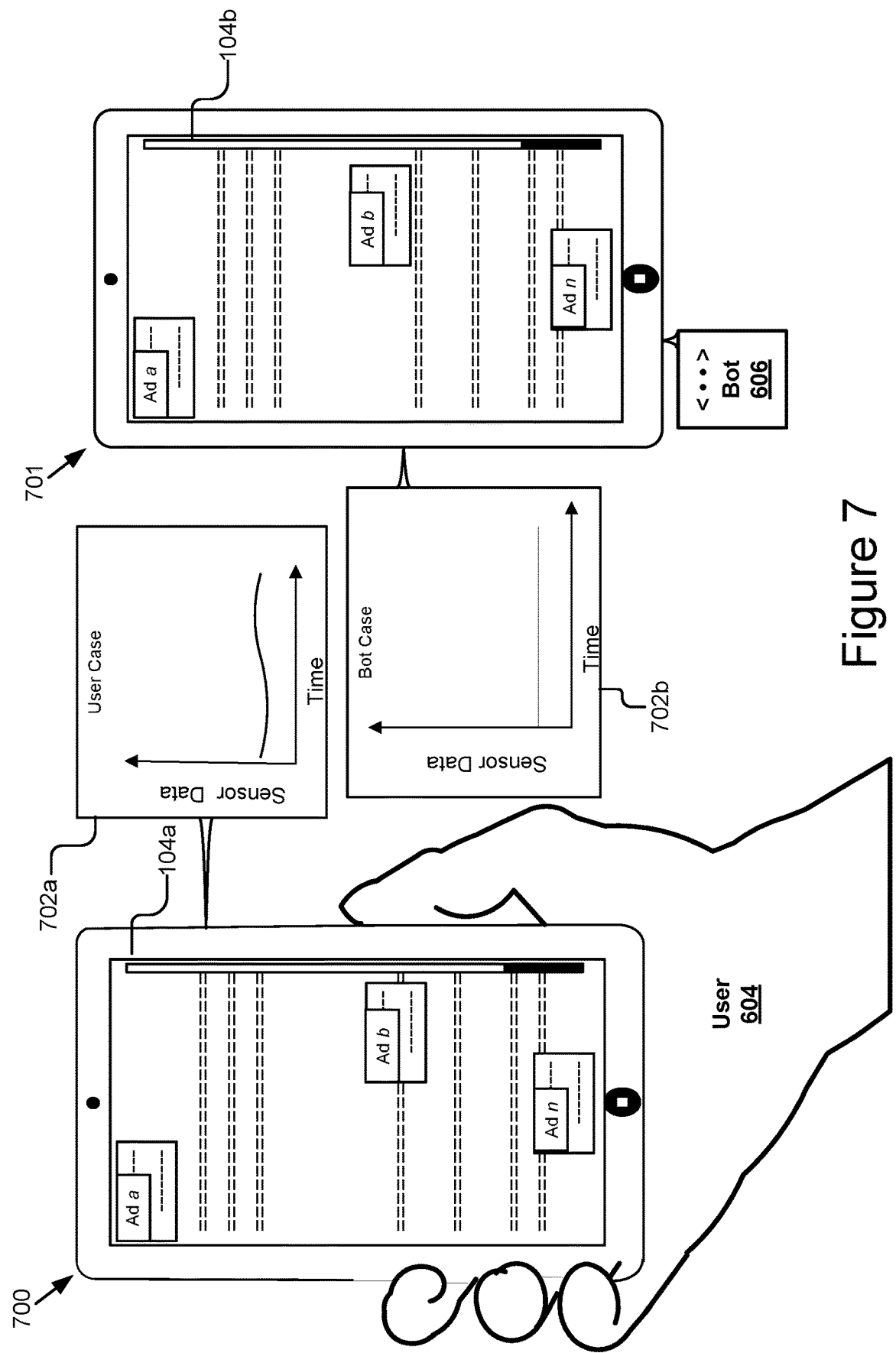
FIG. 7 is another graphical representation of an example user interface of a human input versus a bot input.

FIG. 7 is a graphical representation of an example user interface of a human input 700 versus a bot input 701. As shown in FIG. 7, a user 604 may be using a user device 104*a* that includes a GUI with advertisements a-n. As shown in graph 702*a*, the sensor data over time for the user 604 may include deviations and changes. For example, when a user is holding the user device 104*a* while viewing the display device 110, one or more of the sensors may capture data related to the user, such as pressures of an input, changes in sound captured by a microphone, accelerometer data, etc. The data variability processor 140 may use the deviations in the sensor data to infer that an input is provided by the user 604.

As shown in FIG. 7, the bot 606 may be interacting with the content of user device 104*b*. In some implementations, the bot may be interacting with software representing the application running on the user device 104*b*, rather than with the actual user device 104*b*. As shown in graph 702*b*, the accelerometer data over time for the bot 606 may include no (or minimal) deviations and changes to the sensor data over time. Since the bot 606 isn't causing motion or changes that are detectable by the sensors of the user device 104*b*, the sensors do not collect any data that includes variations and the data variability processor 140 can determine from the sensor data that the bot 606 provided an input rather than the user 604.

Figure 8:
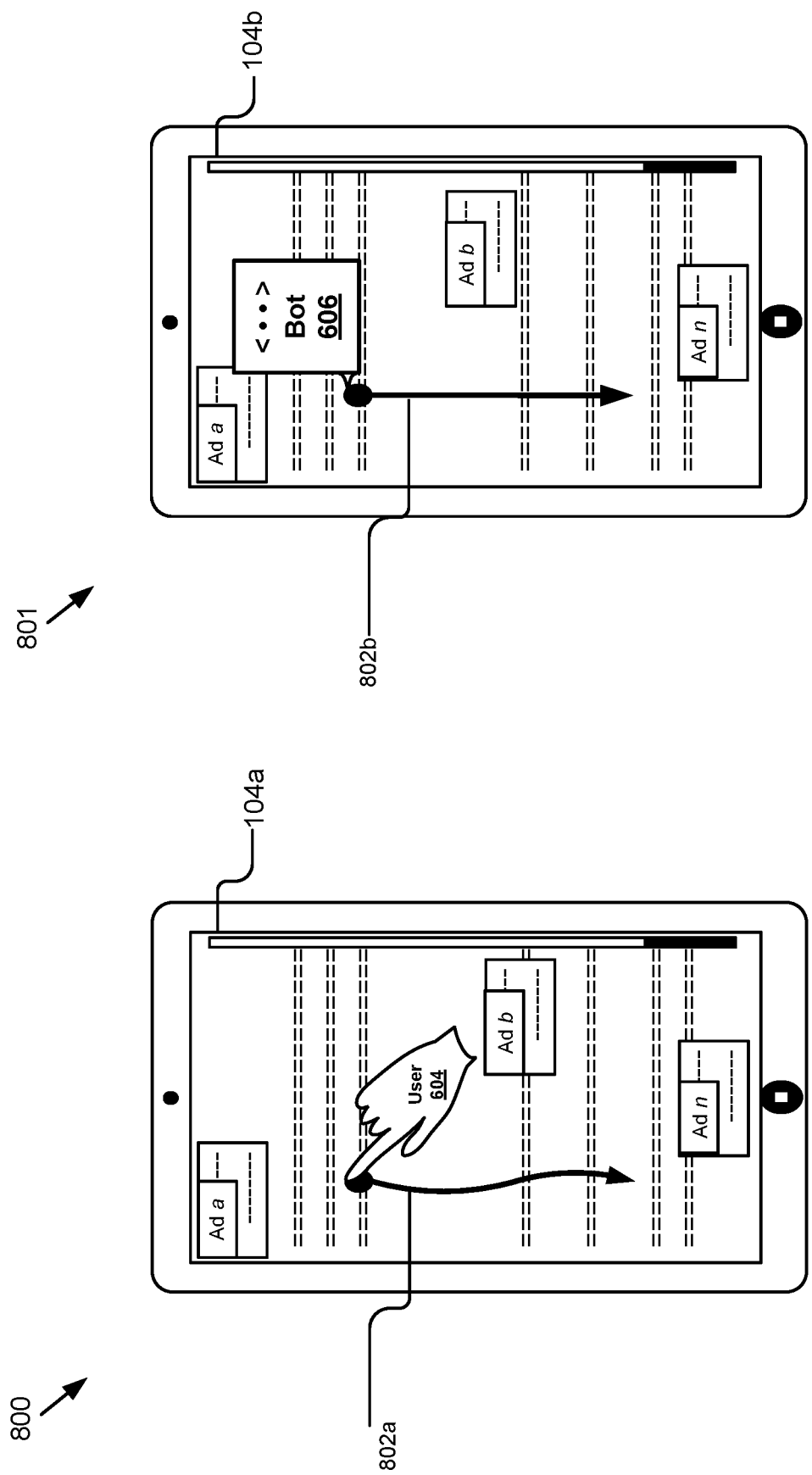
FIG. 8 is another graphical representation of an example user interface of a human input versus a bot input.

FIG. 8 is a graphical representation of an example user interface of a human input 800 versus a bot input 801. As shown in FIG. 8, a user 604 may be using a user device 104*a* that includes a GUI with advertisements a-n. As represented by the input 802*a*, a touch (such as a swipe down) by the user may not be perfectly straight and will often include deviations in the straightness and/or direction of the input 802*a*. For example, when a user is holding the user device 104*a* while viewing the display device 110, the input 802*a* represented as a swipe by the user 604 often curves at the end or introduces other deviations. These captured deviations may be used by the data variability processor 140 to determine that the user 604 is viewing the content and providing the input 802*a*.

As shown in FIG. 8, the bot 606 may be interacting with the content of user device 104*b*. In some implementations, the bot may be interacting with software representing the application running on the user device 104*b*, rather than with the actual user device 104*b*. As shown by input 802*b*, the input 802*b* by the bot 606 may include no (or minimal) deviations and changes to the straightness of the input 802*b*. Since the bot 606 isn't causing motion on the user device 104*b*, but rather is running software that mimics a swipe on the applications, the accelerometer does not detect any deviations in the input 802*b* and the data variability processor 140 can determine from the sensor data that the bot 606 provided an input 802*b* rather than the user 604.

It should be understood that the present disclosure is illustrated by way of example, and not by way of limitation in the figures of the accompanying drawings in which like reference numerals are used to refer to similar elements. Further, in the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in other suitable ways. Additionally, the disclosure is not limited to implementation in any specific programming language, or for any specific operating system or environment.

What is claimed is:

1. A computer implemented method for determining an input source, the computer implemented method comprising:

receiving an input associated with an application presented on a display device;

capturing sensor data associated with the input;

detecting a variance in the sensor data, the variance being the sensor data is a deviation in the input captured in the sensor data;

comparing the variance with variance criteria, the variance criteria being a characteristic of the sensor data expected based on the input, and the variance criteria including a threshold of the deviation;

determining whether the input is provided by a human user or mimicked by a programmed device based on the comparison of the variance with the variance criteria by determining that the input is provided by the human user responsive to the deviation in the input exceeding the threshold of the deviation of the variance criteria; and storing the determination that the input is provided by the human user as analytics data in association with the application.

2. The computer implemented method of claim 1, wherein the input represents a touch on a touchscreen of the display device.

3. The computer implemented method of claim 1, wherein the deviation in the input is a change in one of a direction of the input and a pressure of the input.

4. The computer implemented method of claim 1, wherein the deviation in the input is a change in accelerometer data of the display device.

5. The computer implemented method of claim 1, wherein detecting the variance in the sensor data further comprises:

detecting a location of the input on a touchscreen of the display device; and comparing the location of the input on the touchscreen to a variability profile to detect the variance in the location of the input on the touchscreen.

6. A system comprising:

one or more processors; and one or more memories storing instructions that, when executed by the one or more processors, cause the system to perform operations including:
- receiving an input associated with an application presented on a display device;
- capturing sensor data associated with the input;
- detecting a variance in the sensor data, the variance in the sensor data being a deviation in the input captured in the sensor data;
- comparing the variance with variance criteria, the variance criteria being a characteristic of the sensor data expected based on the input, and the variance criteria including a threshold of the deviation;
- determining whether the input is provided by a human user or mimicked by a programmed device based on the comparison of the variance with the variance criteria by determining that the input is provided by the human user responsive to the deviation in the input exceeding the threshold of the deviation of the variance criteria; and
- storing the determination that the input is provided by the human user as analytics data in association with the application.

7. The system of claim 6, wherein the input represents a touch on a touchscreen of the display device.

8. The system of claim 6, wherein the deviation in the input is a change in one of a direction of the input and a pressure of the input.

9. The system of claim 6, wherein the deviation in the input is a change in accelerometer data of the display device.

10. The system of claim 6, wherein detecting the variance in the sensor data further comprises:
- detecting a location of the input on a touchscreen of the display device; and
- comparing the location of the input on the touchscreen to a variability profile to detect the variance in the location of the input on the touchscreen.

11. A computer implemented method for determining an input source, the computer implemented method comprising:
- receiving an input associated with an application presented on a display device, the input including a touch on a touchscreen of the display device;
- capturing accelerometer data associated with the display device concurrent with receiving the input;
- determining a direction of the touch on the touchscreen;
- identifying a variability profile of an expected touch on the touchscreen of the display device, the variability profile including an accelerometer model and a direction model;
- comparing the accelerometer data associated with the display device with the accelerometer model of the variability profile;
- comparing the direction of the touch on the touchscreen with the direction model of the variability profile;
- determining that the input is provided by a programmed device mimicking a human user responsive to one of the accelerometer data and the direction of the touch matching with the variability profile that represents the programmed device; and
- storing the determination that the input is provided by the programmed device mimicking the human user as analytics data in association with the application.

12. The computer implemented method of claim 11, wherein the touch on the touchscreen is one of a swipe, a tap, a pinch, and a drag on the touchscreen of the display device.

13. The computer implemented method of claim 11, further comprising:
- capturing a pressure of the input including the touch on the touchscreen of the display device; and
- comparing the pressure of the input including the touch on the touchscreen to the variability profile that includes a pressure model.

14. The computer implemented method of claim 11, wherein the variability profile is updated over time.

* * * * *